US008510581B2

(12) United States Patent
Carvalho et al.

(10) Patent No.: US 8,510,581 B2
(45) Date of Patent: Aug. 13, 2013

(54) ANTICIPATION OF POWER ON OF A MOBILE DEVICE (75) Inventors: Jose Mendes Carvalho, Fonsorbes (FR); Fabrice Cotdeloup, Toulouse (FR); Yaney Rodriguez, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 332 days.

(21) Appl. No.: 12/531,914

(22) PCT Filed: Mar. 26, 2007

(86) PCT No.: PCT/IB2007/051439
§ 371 (c)(1),
(2), (4) Date: Sep. 18, 2009

(87) PCT Pub. No.: WO2008/117133
PCT Pub. Date: Oct. 2, 2008

(65) Prior Publication Data
US 2010/0115309 A1 May 6, 2010

(51) Int. Cl.
*G06F 1/00* (2006.01)
(52) U.S. Cl.
USPC ............... 713/323; 713/2; 713/300; 713/310; 713/320; 713/324; 713/330
(58) Field of Classification Search
USPC ............. 713/2, 300, 310, 320, 324, 330, 323
See application file for complete search history.

(56) References Cited

U.S. PATENT DOCUMENTS

| | | | | |
|---|---|---|---|---|
| 5,954,820 A * | 9/1999 | Hetzler | | 713/323 |
| 5,991,827 A * | 11/1999 | Ellenby et al. | | 710/8 |
| 6,098,118 A * | 8/2000 | Ellenby et al. | | 710/8 |
| 6,654,895 B1 * | 11/2003 | Henkhaus et al. | | 713/320 |
| 6,885,974 B2 * | 4/2005 | Holle | | 702/182 |
| 6,892,313 B1 * | 5/2005 | Codilian et al. | | 713/323 |
| 6,961,859 B2 * | 11/2005 | Derocher et al. | | 713/320 |
| 7,430,675 B2 * | 9/2008 | Lee | | 713/320 |
| 7,437,578 B2 * | 10/2008 | Menzl | | 713/300 |
| 7,546,477 B2 * | 6/2009 | Breen et al. | | 713/323 |
| 7,689,850 B2 * | 3/2010 | Cantwell et al. | | 713/323 |

(Continued)

FOREIGN PATENT DOCUMENTS

EP 1363180 A2 11/2003
WO 2007007300 A2 1/2007

OTHER PUBLICATIONS

International Search Report and Written Opinion correlating to PCT/IB2007/051439 dated Jan. 30, 2008.

*Primary Examiner* — Jaweed A Abbaszadeh (57) ABSTRACT

A method of managing the power up of a device that has power down state and at least two power up states. The method includes statistically analyzing the power up time profile of the device. The method also includes determining one or more predetermined statistical indicators associated with the stored power up time profile. The method further includes calculating an anticipated start up time from the statistical indicators. The method also includes at the anticipated start up time changing the device state from the power down state to a predetermined one of the power up states depending on the statistical indicators. The method further includes maintaining the device at predetermined power up states for a predetermined duration. The method also includes returning the device to the power down state if there is no user interaction with the device during the predetermined duration.

20 Claims, 5 Drawing Sheets

(56) References Cited

U.S. PATENT DOCUMENTS

| | | | |
|---|---|---|---|
| 7,696,905 B2* | 4/2010 | Ellenby et al. | 340/974 |
| 7,840,820 B2* | 11/2010 | Shimada | 713/300 |
| 7,861,098 B2* | 12/2010 | Theocharous et al. | 713/300 |
| 7,861,099 B2* | 12/2010 | Theocharous et al. | 713/300 |
| 8,041,967 B2* | 10/2011 | Belady et al. | 713/320 |
| 2002/0178387 A1 | 11/2002 | Theron | |
| 2004/0032605 A1* | 2/2004 | Regimbal | 358/1.13 |
| 2004/0172566 A1 | 9/2004 | Greiger et al. | |
| 2006/0083168 A1 | 4/2006 | Prakash | |
| 2006/0184780 A1* | 8/2006 | Yamada et al. | 713/1 |
| 2006/0259803 A1* | 11/2006 | Edwards et al. | 713/320 |
| 2008/0005599 A1* | 1/2008 | Theocharous et al. | 713/300 |
| 2008/0104431 A1* | 5/2008 | Shimada | 713/300 |
| 2008/0126815 A1* | 5/2008 | Cantwell et al. | 713/323 |
| 2011/0093725 A1* | 4/2011 | Theocharous et al. | 713/300 |

* cited by examiner

$\overline{X}_1$ = 3h 25 min  $\overline{X}_2$ = 7h 47 min
$\sigma_1$ = 18min  $\sigma_2$ = 20min

*Fig. 7*

$\overline{X}$ = 6.17 hours
$\sigma$ = 2.99 hours

*Fig. 8*

ANTICIPATION OF POWER ON OF A MOBILE DEVICE

FIELD OF THE INVENTION

The present invention relates to improvements in or relating to power management, in particular, ways is to reduce the power up time of a device start sequence.

BACKGROUND OF THE INVENTION

For some devices there may be a considerable delay in the power up process. In certain circumstances this can be the order of minutes and can be frustrating for a user. In addition, a device can provide different states of power off. These states enable or not the memories, the core routines and the peripherals of the device.

The ability for a device to be held in a "sleep" mode is known in a number of fields. In these situations the device is held in a "sleep" mode and can be awoken by an appropriate command or button press. However in these circumstances where a "sleep" mode is utilised, there are no intelligent considerations being made.

SUMMARY OF THE INVENTION

Accordingly one object of the present invention is to provide a power management technique which has an element of intelligence. Another object of the present invention is to provide a power management technique that overcomes at least some of the problems associated with the prior art.

The present invention provides a method and system as described in the accompanying claims.

DETAILED DESCRIPTION OF THE PREFERRED EMBODIMENTS

Figure 1:
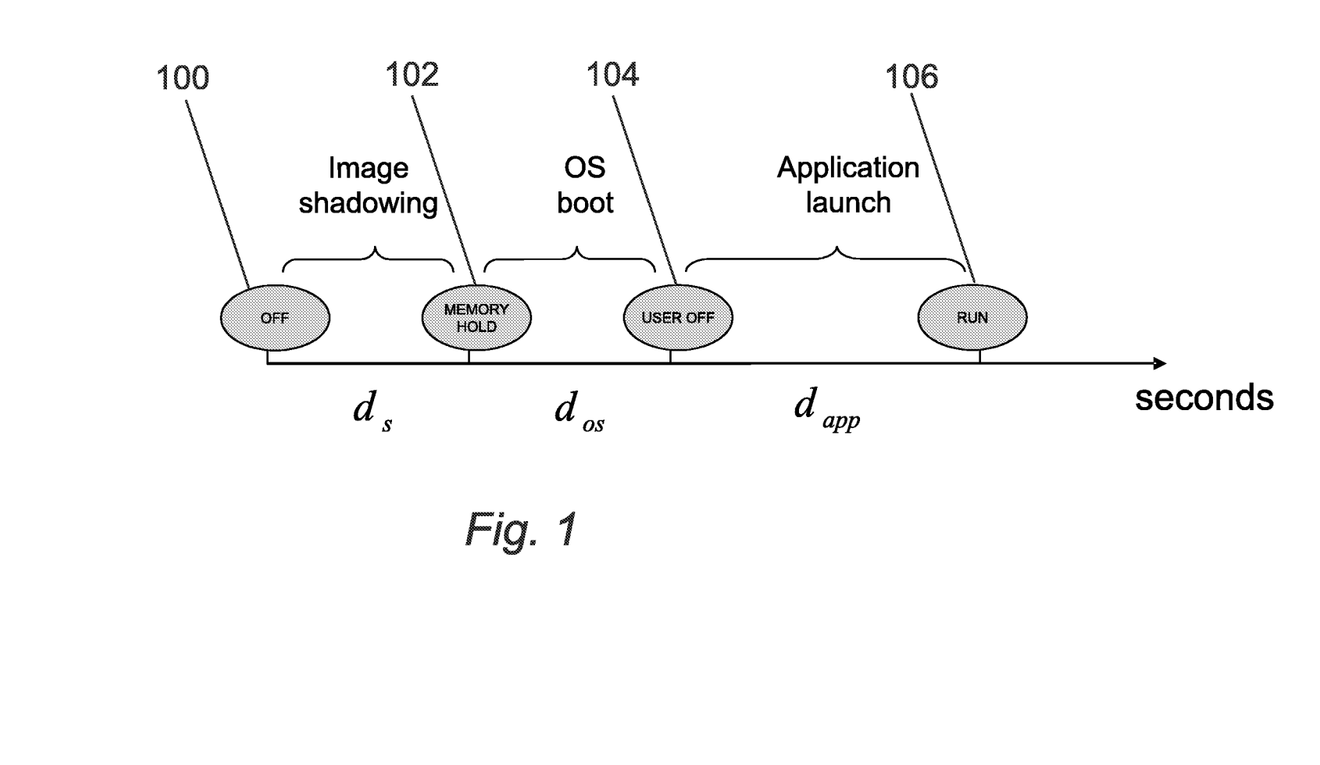
FIG. 1 is a timing diagram showing a typical start up sequence.

Referring now to FIG. 1, the start up timing sequence of a typical device is shown. At 100 the device is off, after a delay $d_s$ the power state is changed to a memory hold power state 102. In the off state no power is supplied to the platform except for the back up battery (also called coin cell battery). In the memory hold mode only memory is maintained and no core. After a further delay $d_{os}$ the device mode is changed to user off state 104. In the user off state core and memory are powered. Next, after a further delay $d_{app}$ the device enters run mode 106. The full delay for start-up $d_{startup}$ is given by the equation:

$$d_{startup} = d_s + d_{os} + d_{app}$$

The aim of the present invention is to statistically reduce the start duration according to certain parameters. These parameters include user activity, alarm, battery level etc.

Figure 2:
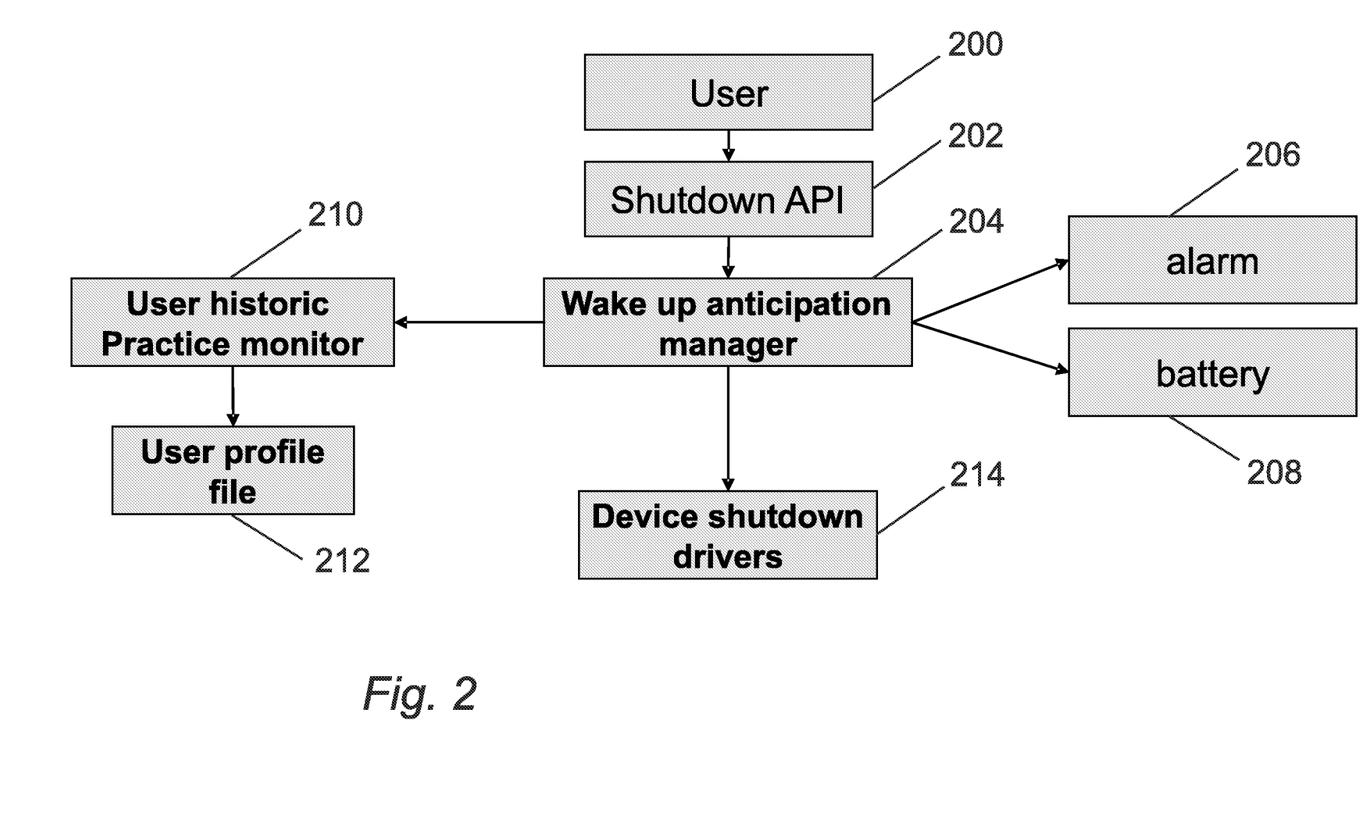
FIG. 2 is a block diagram showing the architecture in accordance with one embodiment of the present invention.

Architecture of a power management control module in accordance with an embodiment of the present invention is shown with respect to FIG. 2. A user 200 actives a shutdown API 202 which in turn activates a wake-up anticipation manager 204. The wake-up anticipation manager is connected to alarm 206 and battery 208 to monitor the same. In addition, the wake-up anticipation manager is connected to a user historic practice monitor 210. This has access to a user profile file 212. The wake-up anticipation manager controls the device shutdown drivers 214. Each of the elements of the power management control module may be implemented in any appropriate manner, either in software or hardware. In either case the particular elements could include memory, processing, control, monitoring or any other appropriate module. The manner in which the wake-up anticipation manager operates will now be described in greater detail.

Figure 3:
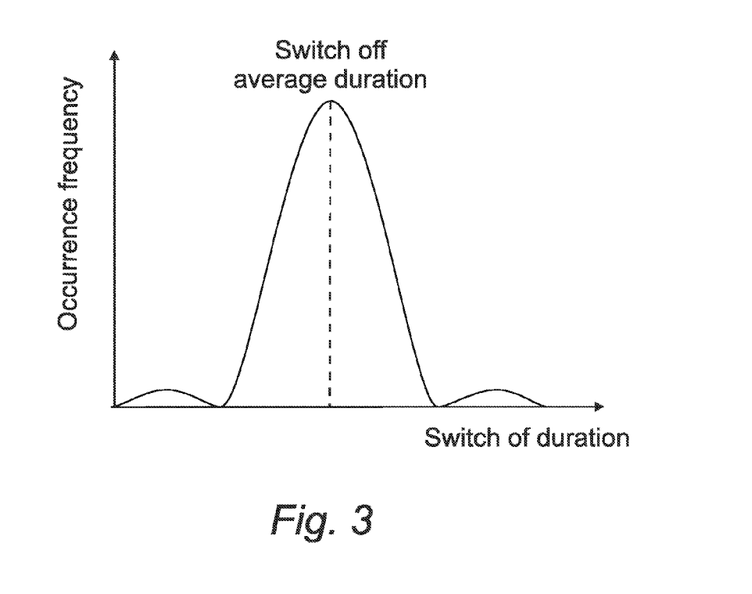
FIG. 3 is a graph of the switch of duration versus the occurrence frequency in accordance with in one embodiment of the present invention.

The important feature that enables the wake-up anticipation manager to operate is a determination of the user historic practices. The technique involves measuring the device off state durations and determining these distributions on a Gaussian distribution graph. This graph may be as shown in FIG. 3. In addition the standard deviation is determined and is used to measure the statistical dispersion of the switch off duration. If this dispersion is low then the probability of waking up at the right time and anticipated user power up is significant. The mean switch off duration is calculated by the following formula:

$$\bar{x} = \frac{1}{N}\sum_{i=1}^{N} x_i$$

Where $\bar{x}$ is the mean of N samples ($x_i$). The standard deviation is calculated in accordance with $\bar{x}$ $x_i$ using the following formula:

$$\sigma = \sqrt{\left(\frac{1}{n} \times \sum_{i=1}^{n}(x_i - \bar{x})^2\right)}$$

Where $\sigma$ is the standard deviation between each sample $x_i$ and the mean $\bar{x}$ for n samples. The graph in FIG. 3 shows the switch off average duration for the device in question. This graph is then analyzed to determine the arithmetic mean and standard deviation in accordance with the formulae above.

Figure 4:
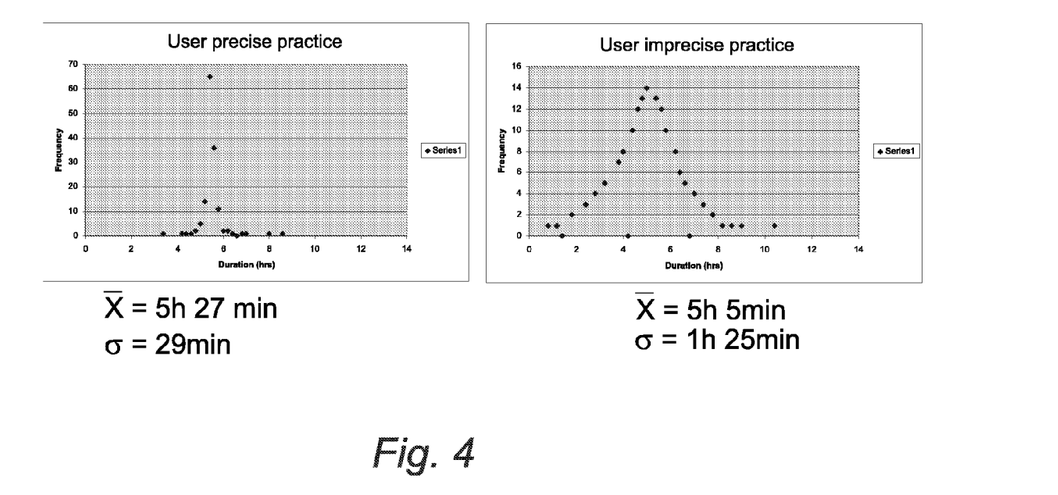
FIG. 4 is a graph showing the user practice in accordance with the one embodiment of the present invention.

If then the mean and standard deviation are determined and used to determine a user practices profile (e.g. as is shown in FIG. 4) it is possible to predict the average next time for power up of the device. With this information it is possible to power up the device for "y" minutes in anticipation of the user completing powering up the device. If $y \rangle 2\sigma$ an alarm may be set to power the device in ($\bar{x} - y/2$) minutes. When the device wakes up, it will wait for y minutes and if no user power up is detected the device will be powered off. If $y \langle 2\sigma$ no power up anticipation is done and the algorithm is not activated.

From the graph in FIG. 4 the mean is respectively 5 hours and 27 minutes and 5 hours 5 minutes for graphs a and b. The standard deviation is respectively 29 minutes and 1 hour 25 minutes. It can be seen that the number of minutes the device is powered up for depends on the practices of the user. For a precise user practice the standard deviation is relatively low (graph a) and as such the number of minutes for which the device is powered up is also relatively low. On the other hand for imprecise user practices (as shown in graph b) the standard deviation is 1 hour 25 minutes and accordingly the amount of time for which the device must be powered up is relatively long. It may be determined in this latter case that no power up stage is to be effected.

The value of the standard deviation will thus indicate the programmed power up sequence. For example if σ⟨y/2 the wake-up is performed in a memory hold state. On the other hand if σ⟨y/4 wake up may be performed in user off state mode. In other words the state of the device may be selected depending on the amount of time the device will need to be in that mode as determined from the statistical deviation.

In order to be efficient the number of switch off durations need to be minimized. This requires the definition of a minimum, which is generated by the algorithm in the following manner. If the last duration d<y, then for the next switch off the power anticipation will be performed. However in the last duration d>y, then no power up anticipation will be performed for the next switch off. In other words the probability of the user completing the power up stage is determined to influence the subsequent operations.

The improvements in the average start up duration from the user point of view can be seen by reference to an example. If someone is traveling on an airplane for four hours for example and does this on a regular basis then 90% of the switch off durations are going to be of the order of four hours. If it is considered that:

$$d_{startup} = d_s + d_{os} + d_{app} = 39 \text{ seconds}$$

The time to start the application would generally be 39 seconds. However, using the algorithm according to the present invention, the average start up duration from the user point of view is reduced to 21.9 seconds. This is nearly half the normal start up time.

The value of y determines the balance that is struck between speeding up power up and saving power. The "y" value can be determine in order to not consumes more than of 5% of extra energy. This value is then calculated in accordance with Et, $E_{lpm}$ and nb using the following formula:

$$y = \frac{5 * E_t}{100 * nb * E_{lpm}}$$

Where Et: Total energy available (which depends on the type of battery etc)

$E_{lpm}$: Energy used to performed power up anticipation.

nb: Number of power up anticipation performed.

It will be appreciated that placing the device in more advanced power up stage will have important impacts on power consumption in the same way that important power savings are made by slowing down the powering up process.

It will be appreciated that the present invention requires certain amounts of data with respect to start up time and power on and off time to be stored in order for the algorithm to make its calculations. In order to minimize the amount of storage space occupied by the data a table of frequency distribution of duration is created. An example of such a table is shown below.

TABLE 1

| Duration (min) | Frequency | Take into Account (f > 1) | Validity | Group | Time average (min) |
|---|---|---|---|---|---|
| [0-10] | 0 | No | 0 | 1 | 900 |
| [20-30] | 1 | No | 5 | 1 | 950 |
| [30-40] | 2 | Yes | 18 | 1 | 920 |
| [40-50] | 5 | Yes | N(max) | 1 | 930 |
| ... | ... | | | ... | |

In order to populate this table frequency distribution formulas are utilized. With these formulae the arithmetic mean and standard deviation are calculated on a frequency basis. The equations for these are:

$$\bar{x} = \frac{1}{N} \sum_{i=1}^{N} x_i \times f$$

with $$N = \sum_{i=1}^{n} f$$

$$\sigma = \sqrt{\left(\frac{1}{N} \times \sum_{i=1}^{n} (x_i - \bar{x})^2 \times f\right)}$$

As with many statistical distribution processes, any values which are out of the norm can seriously disturb the results and in this example the resultant algorithm. In order to overcome the problems associated with rogue values the algorithm enables these rogue values to be isolated and removed from the calculations.

Figure 5:
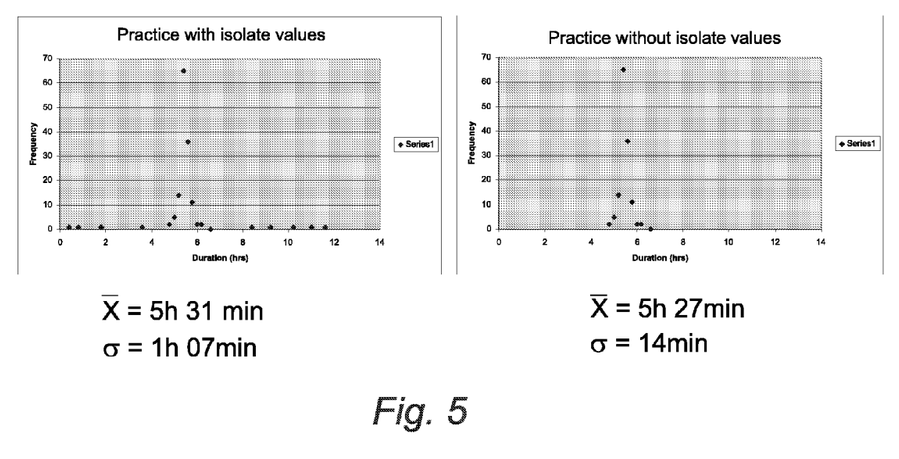
FIG. 5 is a graph demonstrating rogue values and their isolation.

FIGS. 5(a and b) shows a graph of frequency versus duration which includes the isolated values in graph a and does not include the isolated value in graph b. For graph a the mean duration of power off is 5 hours 31 minutes and the standard deviation is 1 hour 07 minutes however for graph b, where the isolated values are removed the mean is 5 hours 27 minutes whilst the standard deviation reduces to just 14 minutes. As will be appreciated the isolation and deletion of the rogue values significantly improves the standard deviation and thus the calculations carried out by the algorithm as described above.

Referring again to table 1 where any frequency of duration occurs only a few times these durations are removed as they constitute rogue values. The frequency at which values are classified as rogue values can be changed depending on the specific requirements of the invention. In addition if values are found to be too old (i.e. expired) they may be removed from the calculations. If after a power off action some values are not updated then they will be removed from the table and the calculations that follow.

Figure 6:
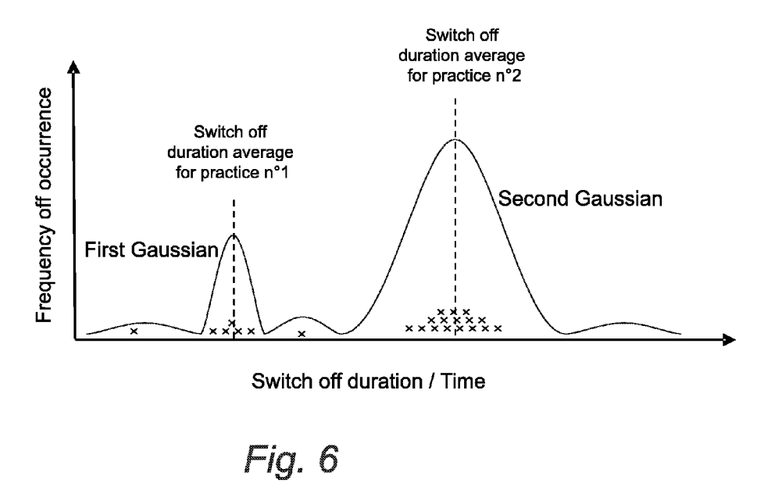
FIG. 6 is a graph showing a complex user historic practice in accordance with one embodiment of the present invention.

As can be seen in FIG. 6 the user history is often complex. Instead of just one power off duration there may be two or even more. In FIG. 6 the frequency of occurrence of the switch off durations are plotted against each other and show two Gaussian curves. The algorithm can identify the two Gaussian curves and calculate the arithmetic mean of power off duration and the standard deviation of each. If the values of frequency versus power off duration do not allow the mean and standard deviation for each Gaussian curves to be determined then the algorithm will not be able to operate.

Figure 7:
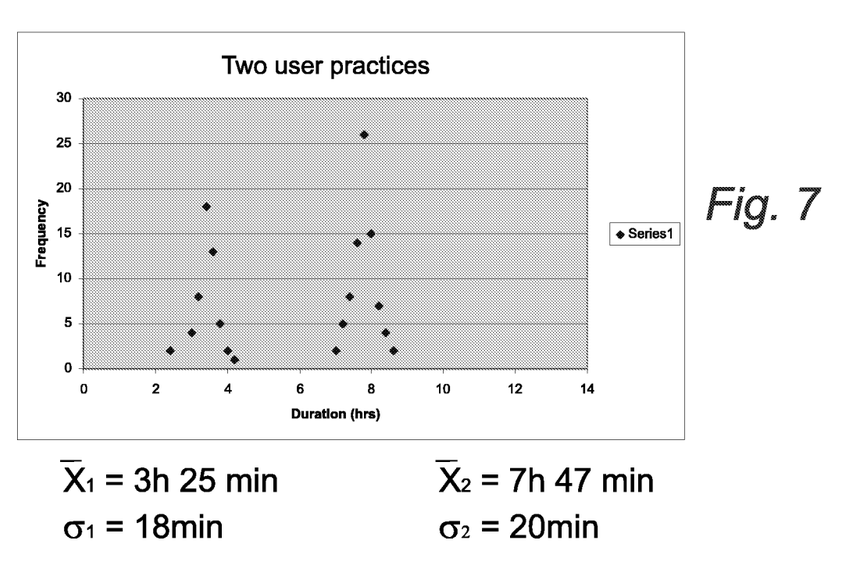
FIG. 7 is a graph showing a complex user practice with first and second switch off times.

FIG. 7 shows a graph of the user having two such practices. If the two groups are not recognized the mean is 6 hours 5 minutes and the standard deviation is 2 hours 9 minutes. This would mean that the algorithm would be impractical in this situation. However if it is recognized that there are two groups the values of these can be calculated independently. In the graph shown there are two groups one having a mean power off duration of 3 hours 25 minutes and the standard deviation of 18 minutes whilst the other practice has a mean of 7 hours and 47 minutes and a standard deviation of 20 minutes. In this circumstance as the standard deviation is a reasonable value the algorithm can be used on both different groups and a power up process can be carried out in respect of both curves.

Returning again to the table 1 the fact that a curve belongs to a certain group can be indicated therein as is shown in the group column. As it will be appreciated it is not always simple to designate the right group when power up is performed. In order to overcome this, the device always places the result in the lowest group and then if the user power on key is not pressed, a new shutdown is performed. The next power up anticipation is programmed and performed when the time comes.

In these complicated user historic practices a link can sometimes be built between the two times that the device is powered down. In addition the delay between the two power downs may also be identified. The algorithm can then be used to determine if any correlation exists between the two power down events. The same process is used on each group in terms of determining the arithmetic mean and standard deviation; however it is not the switch off duration that is taken into account but the time of the day.

If for each group the standard deviation is "correct" (less than the threshold y minutes and there is no overlap between the groups) then the algorithm is able to operate in an optimal manner. If it is not possible to create a relationship between the two groups the algorithm will be less able to anticipate the power up. The final column in table 1 gives the average time in minutes that the device is switched off.

It will be appreciated that the powered down duration, the power up duration, the time between them or any other appropriate temporal or activity-based measure may be the basis for the statistical variable which is used in the algorithm. What is important is that a user profile of activity is determined in some meaningful way and that statistical analysis is carried out on that user profile.

Figure 8:
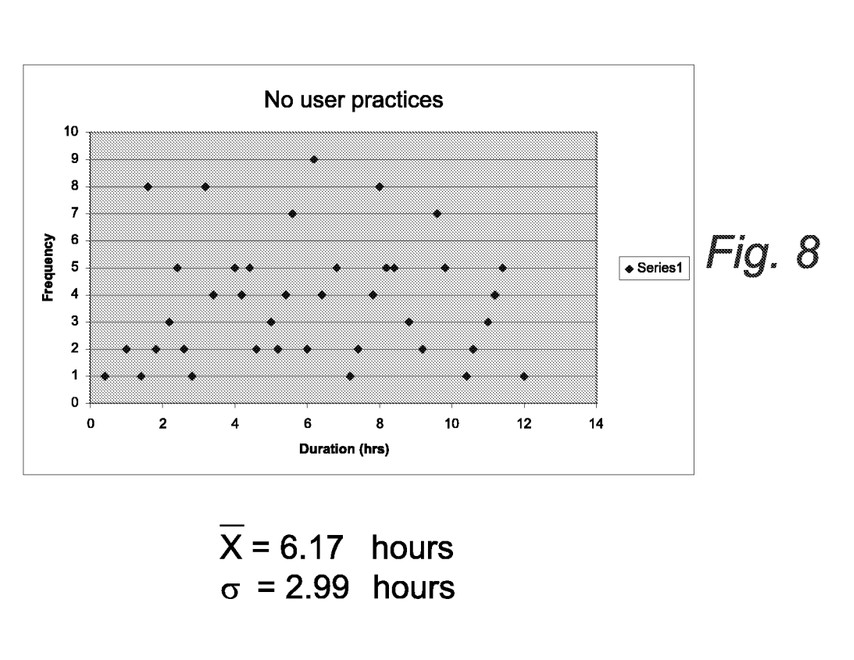
FIG. 8 is a graph showing a non-structured practice with regard to switch off times.

FIG. 8 shows a graph where no user practices can be identified and there is a random distribution of points which result in an arithmetic mean of power off duration of 6.17 hours and the standard deviation of nearly 3 hours. In this case the algorithm will not be activated in the device as the value of the standard deviation is too significant.

The present invention relates to a algorithm method and apparatus for estimating the probability of when a device is next likely to be switched on. The particular algorithm described is but one example of this and it will be appreciated that the various alternative algorithm based on Gaussian distribution or other statistical methodologies could be used. The algorithm can be deployed in most software platforms and modules for example Linux and Symbian. The device on which this power management technique or apparatus could be used is also unlimited. For example it may be found on a mobile phone, a PDA, a computer, television or any other appropriate device.

One or more of the various embodiments of the present invention give rise to a number of advantages: in particular the idea of storing some of the user device activity information enables intelligent choices to be made with respect to power management. The time delay between the "off states" will be regularly stored. This information will then be used to estimate the probability for the next power up sequence. The device may then be put into an intermediate state awaiting a confirmation power up from the user. If the estimate of next power up time is believed to be accurate, a wake-up event may be programmed into the device. According to the degree of confidence, the power up sequence will decide on the target state of the device. Indeed a power sequence can be performed from different states: for example off, memory hold or user off.

In the "memory hold" mode (also called DEEP IDLE MODE), platform functionality or service is unavailable. All devices are switched off, except power management chip internal logic, and the volatile memories (SDRAM or DDR) that are in self-refresh mode and sustaining the software image. This mode does not support the suspension and later continuance of MCU applications, but rather the ability to quickly restart the operating system to facilitate a faster user-operational start up time comparing to starting from the OFF state as the image shadowing phase is bypassed.

In the "user off" mode (also called OFF SUSPEND), only processor cores and SDRAM cores are supplied. This mode is used to support a fast system restart capability. It gives the appearance to the user that the device is off and it allows the Application processor to be able to perform a fast boot sequence as the image shadowing and OS boot sequence are bypassed. No platform functionality or services are available in this mode.

Each of these states has advantages and inconveniences in terms of speed of power up and power consumption. So the algorithm according to the present invention is important in optimising the sleep, wake up action to be performed and at what time. In addition, if no user wake-up action is performed after a predetermined amount of time the device may be powered off again. The battery level and the next user alarm are also taken into account in order to optimise the operational power management of the device.

It will be appreciated that the algorithm and formulae are shown merely by way of example and various modifications and changes can exist which will not change the essence of the invention.

The invention claimed is:

1. A method of managing the power up of a device that has a power down state, at least two power up states, and a run state, wherein the method comprises:

statistically analysing a power up time profile of the device;

determining one or more predetermined statistical indicators associated with the power up time profile;

calculating an anticipated time for a user power up of the device to the run state based on the one or more predetermined statistical indicators;

at a predetermined amount of time before the anticipated time for the user power up of the device, changing a device state from the power down state to a first predetermined power up state of the at least two power up states in response to the predetermined amount of time being less than a first threshold, and changing the device state from the power down state to a second predetermined power up state of the at least two power up states in response to the predetermined amount of time being more than the first threshold and less than a second threshold; and powering up the device from the first predetermined power up state or the second predetermined power up state to the run state during the user power up in response to a user interaction with the device during a predetermined duration, otherwise maintaining the device at the predetermined one of the at least two power up states for the predetermined duration and then returning the device to the power down state if there is no user interaction with the device during the predetermined duration.

2. The method of claim 1, further comprising storing the power up time profile of the device on the device.

3. The method of claim 1, wherein the step of determining the one or more predetermined statistical indicators comprises determining an average amount of time that the device is powered down and a standard deviation associated therewith based on a Gaussian distribution.

4. The method of claim 1, further comprising the step of selecting one of the at least two power up states of the device based on at least one of the one or more predetermined statistical indicator.

5. The method of claim 1, wherein the step of maintaining the device at the predetermined one of the at least two power up states comprises maintaining the device at a lowest power up state, such that power in the device is conserved.

6. The method of claim 1, further comprising statistically analysing a frequency of power up time in time bands and deleting frequencies below a predetermined threshold from the step of determining the one or more predetermined statistical indicators.

7. The method of claim 1, further comprising calculating a next anticipated point in time to start up the device from the one or more predetermined statistical indicators when there is no user interaction during the predetermined duration.

8. The method of claim 1, further comprising regularly updating the power up time profile of the device.

9. The method of claim 2, wherein the user power up is to a highest power level for the device.

10. The method of claim 1, wherein the first threshold is when the predetermined amount of time is two times a standard deviation of an average length of time that the device is powered down.

11. The method of claim 1, further comprising:
determining an amount of time for a most recent power down duration;
if the amount of time for the most recent duration is less than the predetermined amount of time, at a predetermined amount of time before a next anticipated time for the user power up of the device, changing the device state from the power down state to the first predetermined power up state of the at least two power up states in response to the predetermined amount of time being less than the first threshold, and changing the device state from the power down state to the second predetermined power up state of the at least two power up states in response to the predetermined amount of time being more than the first threshold and less than the second threshold; and
if the amount of time for the most recent duration is more than the predetermined amount of time, not changing the device state at the predetermined amount of time before the next anticipated time for the user power up of the device.

12. A power management control module for managing power up of a device that has a power down state, at least two power up states, and a run state, the power management control module comprising:
a detector to detect a power up time profile of the device;
a processor to calculate one or more predetermined statistical indicators associated with the power up time profile; and
a controller to determine an anticipated time for a user power up of the device to the run state based on the one or more predetermined statistical indicators, and at a predetermined amount of time before the anticipated time for the user power up of the device, to change a device state from the power down state to a first predetermined power up state of the at least two power up states in response to the predetermined amount of time being less than a first threshold, and to change the device state from the power down state to a second predetermined power up state of the at least two power sup states in response to the predetermined amount of time being more than the first threshold and less than a second threshold, and the controller powers up the device from the first predetermined power up state or the second predetermined power up state to the run state during the user power up in response to a user interaction with the device during a predetermined duration, otherwise the controller maintains the device at the predetermined one or the at least two power up states for the predetermined duration and then returns the device to the power down state if there is no user interaction with the device during the predetermined duration.

13. The power management control module of claim 12, wherein the power up time profile of the device is stored on the device.

14. The power management control module of claim 12, wherein the processor determines a mean power down time and a standard deviation associated therewith based on a Gaussian distribution.

15. The power management control module of claim 12, wherein a selected power up state is dependent on at least one statistical indicator.

16. A power management control module for managing power up of a device that has a power down state, at least two power up states, and a run state, the power management control module comprising:
a detector to detect the power up time profile of the device;
a processor to detect one or more predetermined statistical indicators associated with a power up time profile; and
a controller to determine an anticipated start up time for the device to the run state based on the one or more predetermined statistical indicators, and at the anticipated start up time changing a device state from the power down state to a first predetermined power up state in response to the predetermined amount of time being less than a first threshold, and to change the device state from the power down state to a second predetermined power up state in response to the predetermined amount of time being more than the first threshold and less than a second threshold, wherein the controller maintains the device at the predetermined power up state for a predetermined duration and returns the device to the power down state if there is no user interaction with the device during the predetermined duration, wherein the controller powers up the device from the first predetermined power up state or the second predetermined power up state to the run state during the user power up in response to a user interaction with the device during a predetermined duration, and wherein the controller monitors battery power levels and any user alarms associated with the device to assist with a calculation of a required power up time and state.

17. The power management control module of claim 12, wherein multiple power up time profiles may exist for a specific user.

18. A device including a power management control module in accordance of claim 12.

19. The device of claim 18, in the form of a mobile phone.

20. A non-transitory computer readable medium having a computer program stored thereon comprising instructions, that when executed, carry out the steps comprising:
- statistically analysing a power up time profile of a device, the device has a power down state, at least two power up states, and a run state;
- determining one or more predetermined statistical indicators associated with the power up time profile;
- calculating an anticipated time for a user power up of the device to the run state based on the one or more predetermined statistical indicators;
- at a predetermined amount of time before the anticipated time for the user power up of the device, changing a device state from the power down state to a first predetermined one of the at least two power up states in response to the predetermined amount of time being less than a first threshold, and to changing the device state from the power down state to a second predetermined power up state in response to the predetermined amount of time being more than the first threshold and less than a second threshold;
- powering up the device from the first predetermined power up state or the second predetermined power up state to the run state during the user power up in response to a user interaction with the device during a predetermined duration, otherwise maintaining the device at the predetermined one or the at least two power up states for the predetermined duration and then returning the device to the power down state if there is no user interaction with the device during the predetermined duration.

* * * * *